Patented Aug. 14, 1945

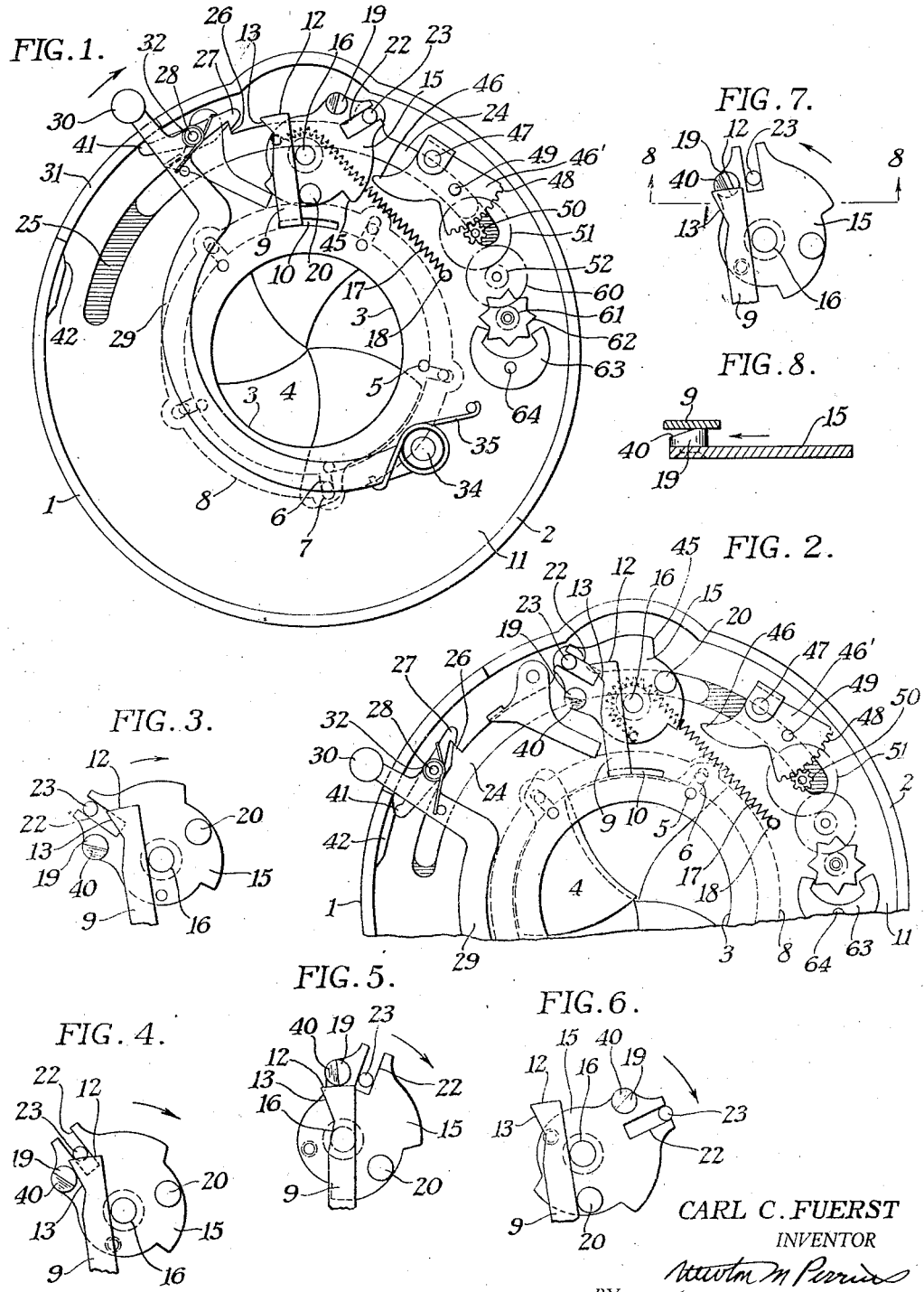

2,382,623

UNITED STATES PATENT OFFICE 2,382,623

AUTOMATIC SHUTTER

Carl C. Fuerst, Rochester, N. Y., assignor to Eastman Kodak Company, Rochester, N. Y., a corporation of New Jersey Application May 4, 1943, Serial No. 485,596

5 Claims. (Cl. 95—63)

This invention relates to photographic shutters. One object of my invention is to provide an automatic shutter structure with which it is possible to obtain a relatively high speed as well as the usual slower automatic speeds. Another object of my invention is to provide a shutter which is so constructed that the trigger may be readily operated without jarring the shutter. Still another object of my invention is to provide a shutter with a shutter leaf structure which is positively driven both for opening and closing the shutter blades. Other objects will appear from the following specification the novel features being particularly pointed out in the claims at the end of the specification.

It has ordinarily been difficult to attain relatively high speeds such as a 1/150 of a second in shutters of the automatic type although such speeds and materially faster speeds are common enough in setting types of shutters. The reason for this is that it is difficult to provide a structure in an automatic shutter which does not place too great a tension on the shutter trigger if a strong spring is used to operate the shutter blades. In my improved type of shutter I have provided a shutter blade driving mechanism which does not require an extremely strong spring and which, therefore, lends itself to the construction of a shutter in which the spring must be both tensioned and released by means of the actuation of the trigger in making an exposure.

Coming now to the drawing wherein like reference characters denote like parts throughout:

Fig. 1 is a top plan view of a shutter with the shutter cover removed illustrating a preferred embodiment of my invention, Fig. 2 is a view similar to Fig. 1 but with parts of the shutter broken away and parts of the operating mechanism shown in different positions, Figs. 3, 4, 5 and 6 are all fragmentary detail views showing the shutter blade driving mechanism in the successive positions through which these parts pass in making an exposure, Fig. 7 is a view similar to Figs. 3 to 6 inclusive showing the parts just before the shutter is completely positioned for an exposure and during the setting of the master member, and Fig. 8 is a fragmentary detail section taken on line 8—8 of Fig. 7.

In the preferred embodiment of my invention shown in the drawing I have illustrated a shutter in which the master member is mounted to turn upon a stud to first tension the shutter spring and then release the shutter spring as the trigger is moved in one direction to make an exposure. There is a lost motion connection between the trigger and the master member including an arcuately slidable lever having a pin and slot connection with the master member and including a latch connection with the trigger. In turning the master member drives the blade ring open and then drives the blade ring closed in order to make an exposure.

More specifically my improved form of shutter comprises a shutter casing 1 which has the usual up-standing flange 2 about the periphery of the shutter and includes an exposure opening 3. The exposure opening is normally covered by shutter blades 4 carried on pivots 5 spaced about the opening 3 and having pins 6 engaging slots 7 in a blade ring 8 oscillatably mounted on the shutter casing. The blade ring 8 carries an arm 9 formed upwardly from the blade ring 8 so as to pass through a slot 10 in the mechanism plate 11. The end 12 of this lever has a rounded surface adjacent an angular cam 13 as shown in the drawing. In Fig. 1 the blades are closed and when the blade operating parts are in the position shown in Fig. 5 the blades are opened. The arm 9 is driven between these two positions by means of a master member 15 which may turn upon a stud 16 under the influence of a spring 17 as will be described hereinafter. The spring 17 may be anchored on a pin 18 attached to the mechanism plate 11.

The master member 15 includes an opening pin 19 and a closing pin 20. Referring to Figs. 3 to 6 inclusive the relationship of these two pins to the blade ring arm 9 is illustrated. Starting with Fig. 3 it will be noticed that the opening pin 19 is spaced from the cam 13 carried by the arm 9. This is the rest position immediately before an exposure starts. When the master member 15 starts to turn, the opening pin 19 strikes the cam 13 swinging the arm until the pin 19 rides over the top of the surface 12 on the end of the arm 9 as illustrated in Fig. 5. Since the pin 19 moves from the Fig. 3 to the Fig. 4 position before moving the arm 9, it gains considerable momentum and when it strikes the arm 9 it moves it rapidly in a clockwise direction to open the blades.

The arm 9 remains in its Fig. 5 position until the closing pin 20 strikes the arm and moves it in a counter clockwise direction to close the blades. The blades remain open momentarily while the master member 15 continues to accelerate in speed between the opening and closing of the shutter blades. All this movement can take place very rapidly, one of the reasons being that there is no spring to hold the shutter blades closed as is customarily used. The blades are, however, held closed since the pin 20 remains in contact with the lever 9 till such a time as another exposure is to be made.

The master member 15 includes a slot 22 engaging a pin 23 on the arcuate shaped slidable arm 24. This arm may slide in a recess or slot 25 in the mechanism plate 11. The pin 23 always engages the slot 22. The arcuate lever 24 includes a latch element 26 projecting upwardly into the path of a latch element 27. This latch element is pivoted at 28 to the trigger arm 29, the handle 30 of which extends outwardly through a slot 31 in the flange 2. A spring 32 tends to turn the latch 27 into contact with the latch 26. The trigger arm 29 is pivotally mounted on a stud 34 encircled by a spring 35 which tends to turn the trigger in a clockwise direction as indicated by the arrow in Fig. 1.

With the parts in the position shown in Fig. 1 the handle 30 may be pressed downwardly in a counterclockwise direction. This causes the latch 27, 26 to move the curved lever 24 to the left with respect to Fig. 1. This causes the pin 23 to ride in the slot 22 so that the spring 17 of the master member 15 will be wound up. During this winding movement the beveled edge 40 of the opening pin 19 will ride under the end 12 of the blade ring arm 9 so that the master member may continue to move to the position shown in Fig. 3. The blade ring arm 9 is sufficiently resilient to permit the relatively slight movement required in permitting the pin to pass under the lever during this setting movement.

As the trigger handle 30 is passed through its slot 31 it reaches a position as indicated in Fig. 2, where the latch element 27 will be swung about its pivot 28 to release the latch 26 of the curved arm 24, thus separating the latch elements. This movement takes place because the end 41 of the latch element 27 strikes a cam 42 which will turn the movable latch element 27 as indicated in Fig. 2. If the handle 30 is still further depressed so that the latch element 27 releases the latch element 26 completely the spring 16 will then cause the master member 15 to move rapidly in a clockwise direction. Since the parts will start from the relative positions shown in Fig. 3 the opening pin 19 will gain momentum before it reaches the position of Fig. 4 in which it strikes the cam surface 13 of the blade ring arm 9 and starts the arm swinging in a clockwise direction through the slot 10. This rocking movement causes the blade ring 8 to swing in a clockwise direction carrying the pins 6 of the shutter blades 4 thereby turning the shutter blades 4 about their pivots 5 and causing them to swing open uncovering the exposure aperture 3.

This movement occurs when the blade ring arm 9 moves from its Fig. 4 to its Fig. 5 position. In Fig. 5 the opening pin 19 has already started to swing past the curved end 13 of the arm 9 and since the arm 9 has been moved to the position in which the blades are fully open this movement does not alter the position of the shutter blades. However, continued movement of the master member 15 causes the closing pin 20 to gain momentum while moving from its position in Fig. 5 to a position in which it strikes the arm 9 driving the arm in a reverse direction to a closed position indicated in Fig. 6. All of these movements take place very rapidly when the master member is not retarded and when it is set for its highest speed exposure.

It is also possible to obtain a series of slow automatic exposures in the following manner: The master member 15 is provided with a shoulder 45 which during its swinging movement passes the end 46 of a lever 46' pivoted at 47 and carrying a gear segment 48. There is an upstanding pin 49 carried by this lever which can be moved to move lever 46' in a known manner to and from the path of the shoulder 45. The degree of engagement of the members 45 and 46 determines the duration of the exposure. The gear segment 48 meshes with a gear train composed of a pinion 50, gear 51, pinion 52, gear 60, and a pinion 61 which carries a star wheel 62. This star wheel lies in the path of spaced arms on a pallet 63 pivoted at 64. With the retarding device shown I am able to obtain delayed exposures of from $1/50$ to 1 second. With the mechanism above described if the retarding device is swung to the inoperative position shown I have found that I can readily obtain an exposure of $1/150$ of a second with shutters of the so called Number 2 size.

It will be seen that a shutter constructed in accordance with my invention is completely automatic in that the shutter spring does not have a separate lever for conditioning the master member for an exposure. However, the first part of the movement of the trigger sets the master member spring and toward the end of its movement releases the master member so that the shutter is both set and released each time the shutter trigger is moved in a counter clockwise direction with respect to Fig. 1.

After the shutter has been released the shutter trigger spring 35 returns the trigger to its Fig. 1 position in which the latch elements 26 and 27 become engaged so that the next downward movement of the trigger will repeat the operation described above and make another exposure.

I claim:

1. In a shutter for cameras of the type including an aperture casing, shutter blades pivotally mounted therein for movement to open and close the aperture, and a blade ring operably attached to each blade for simultaneously operating the blades, the combination with said blade ring, of an arm extending therefrom, a pivotally-mounted master member having a set position lying beneath the arm, two pins carried by the master member one on each side of the arm when in its set position, the first for striking and opening and the second pin for striking and closing the shutter blades, a shutter trigger movably mounted on the casing, a slidable member operably connected to the master member, a latch for moving the slidable member by the trigger, a cam for releasing the latch when the master member reaches its set position whereby one pin carried by the master member may strike and move the lever to open the shutter blades, the lever turning with the blade ring about a center spaced from the center of the master member causing said pin to ride off the end of said lever as the master member turns about its pivot, and the second pin driving said arm in a reverse direction.

2. A shutter according to claim 1 characterized by the said pin for opening the shutter having a beveled surface and the arm extending from the blade ring being resilient enabling said last-named pin to pass under said arm in setting the shutter.

3. A shutter according to claim 1 characterized by the said arm extending from the blade ring being resilient and the centers of the blade ring and the master member being offset to permit the first pin to open the blades and ride off the end of the lever, and the second pin to strike the lever and close the blades, said second lever operating pin always remaining on one side of the arm regardless of the position of the master member.

4. A shutter according to claim 1 characterized by the arm extending from the blade ring having a cam surface to be engaged by the first pin carried by the master member, the centers of the master member and blade rings being offset and so positioned that the blade ring arm may be disengaged from the first pin a material time interval before the second master member pin engages and moves the arm.

5. A shutter according to claim 1 characterized by the arm extending from the blade ring having a cam surface to be engaged by the first pin carried by the master member, the centers of the master member and blade rings being offset and so positioned that the blade ring arm may be disengaged from the first pin a material time interval before the second master member pin engages and moves the arm, and a cam on the master member, a retard mechanism including a lever mounted for movement into and out of the path of movement of the master member cam and engageable before said second pin moves said arm.

CARL C. FUERST.